UNITED STATES PATENT OFFICE.

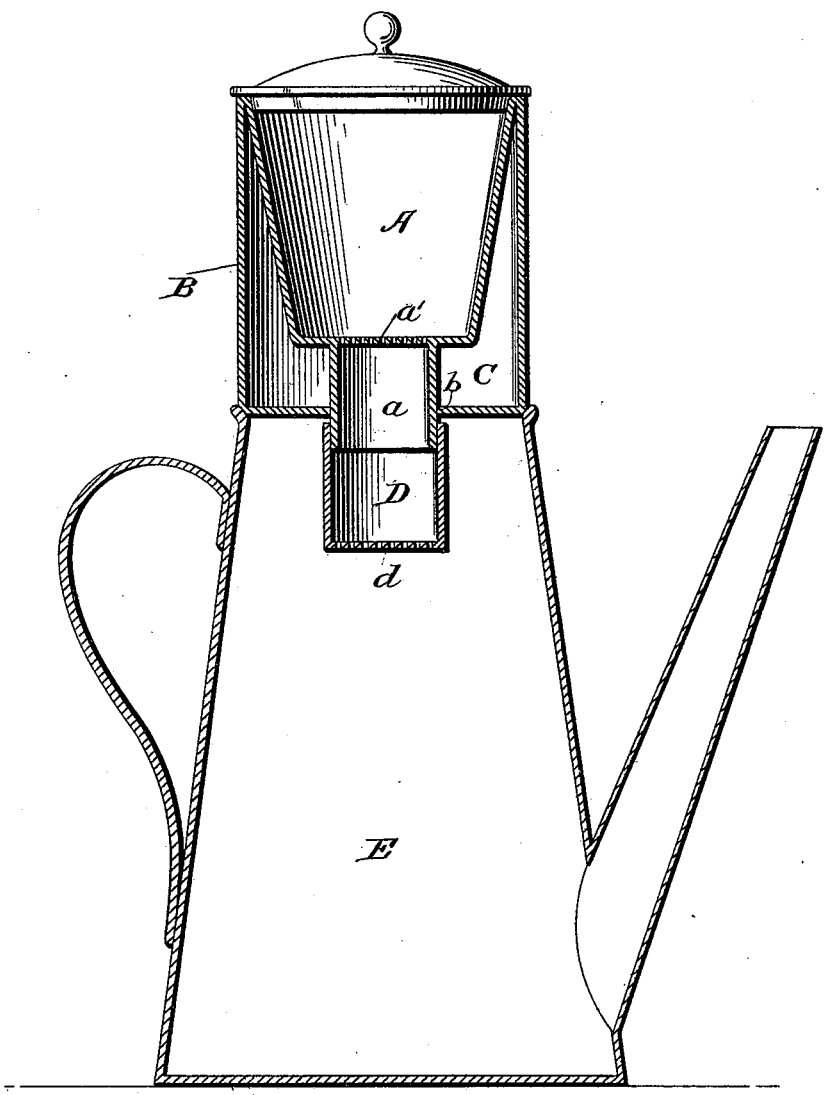

WILLIAM J. PALM, OF BEAVER DAM, WISCONSIN.

PERCOLATING COFFEE-POT ATTACHMENT.

SPECIFICATION forming part of Letters Patent No. 637,481, dated November 21, 1899.

Application filed February 2, 1898. Serial No. 668,901. (No model.)

*To all whom it may concern:*

Be it known that I, WILLIAM J. PALM, a citizen of the United States, residing at Beaver Dam, in the county of Dodge and State of Wisconsin, have invented a new and useful Improvement in Percolating Coffee-Pots, of which the following is a specification.

The invention relates to improvements in coffee-percolators.

The object of the invention is to provide a device of this character which shall be simple of construction, durable in use, and comparatively inexpensive of production and which will effectively secure all the extract of the ground coffee in a single passage of the water through it.

With these and other objects in view the invention consists in certain features of construction and combination of parts, which will be hereinafter fully described and claimed.

In the accompanying drawing, the figure illustrates in vertical longitudinal section my improved coffee-percolator in position.

A represents the hot-water cup of the percolator, surrounded by a jacket B, which forms an air-space C. This jacket extends downwardly and around under a portion of the bottom of the cup A and is provided with a central orifice $b$, through which the sleeve $a$ of the cup A projects. That portion of the bottom of the cup circumscribed by the sleeve $a$ is formed with minute perforations $a'$.

D denotes the coffee-receptacle, which is adapted to contain the ground coffee and is provided with a perforated bottom $d$. This coffee-receptacle is removably secured in any suitable manner to the sleeve $a$, so that it may be slipped on or off as it is desired to charge it with coffee.

In using the utensil the coffee is placed in the receptacle D, which is then secured upon the sleeve $a$, and the whole is placed upon the coffee-pot E. Hot water is now poured into the cup or vessel A, which, dripping slowly down upon the ground coffee in the receptacle D, first completely saturates it, and then the pressure from above forces the rich extract down through the bottom of the receptacle D, self-filtered, into the coffee-pot.

The water is kept hot during the process by the jacket B, which practically forms a double wall for the sides and a portion of the bottom of the cup A.

Having thus described the invention, what is claimed, and desired to be secured by Letters Patent, is—

In a coffee-percolator, the combination with the cup, a portion of the bottom of which is perforated, a sleeve extending downwardly from the said bottom around the perforations, a jacket surrounding the sides of the cup and a portion of the bottom, and provided with a central aperture through which the sleeve projects, and a removable coffee-receptacle having a foraminous bottom, substantially as and for the purpose set forth.

WILLIAM J. PALM.

Witnesses:
H. M. SHEPARD,
A. N. MIRLACH.